(12) United States Patent
Padmanabhan

(10) Patent No.: US 6,783,270 B1
(45) Date of Patent: Aug. 31, 2004

(54) FRACTIONAL AND HIGHER LOBED CO-ROTATING TWIN-SCREW ELEMENTS

(75) Inventor: Babu Padmanabhan, Bangalore (IN)

(73) Assignee: Steer Engineering (P) Limited, Bangalore (IN)

( * ) Notice: Subject to any disclaimer, the term of this patent is extended or adjusted under 35 U.S.C. 154(b) by 0 days.

(21) Appl. No.: 10/332,870

(22) PCT Filed: Jul. 31, 2000

(86) PCT No.: PCT/IN00/00071
§ 371 (c)(1),
(2), (4) Date: Jan. 13, 2003

(87) PCT Pub. No.: WO02/09919
PCT Pub. Date: Feb. 7, 2002

(51) Int. Cl.[7] ................................ B29B 7/48
(52) U.S. Cl. ........................ 366/82; 366/85
(58) Field of Search .................. 366/81, 82, 83, 366/85, 297, 301; 425/204, 208

(56) References Cited

U.S. PATENT DOCUMENTS

| | | | | |
|---|---|---|---|---|
| 3,146,493 A | * | 9/1964 | Steinle et al. | 366/82 |
| 3,608,868 A | * | 9/1971 | Koch | 366/82 |
| 3,744,770 A | * | 7/1973 | Ocker et al. | 366/82 |
| 3,749,375 A | * | 7/1973 | Hermann et al. | 366/82 |
| 4,300,839 A | * | 11/1981 | Sakagami | 366/85 |
| 5,048,971 A | * | 9/1991 | Wall et al. | 366/85 |
| 6,048,088 A | * | 4/2000 | Haring et al. | 366/85 |
| 6,116,770 A | * | 9/2000 | Kiani et al. | 366/82 |
| 6,170,975 B1 | * | 1/2001 | Andersen | 366/82 |
| 6,447,156 B2 | * | 9/2002 | Maris | 366/82 |

* cited by examiner

Primary Examiner—Tony G. Soohoo
(74) Attorney, Agent, or Firm—Schox PLC

(57) ABSTRACT

A twin-screw extrude having a novel fractional element has been invented that can provide different tip angles. The twin-screw extruder is suitable for processing thermo plastic, thermo set and other material. It has a barrel with two parallel intersecting bores, two sets of co-rotating fully intermeshed extruder elements that are linked to each other in non rotary manner forming continuous chain, each element operating in one of the bores and each screw being provided with multi lobbed elements that has special geometry.

20 Claims, 4 Drawing Sheets

FRACTIONAL AND HIGHER LOBED CO-ROTATING TWIN-SCREW ELEMENTS

TECHNICAL FIELD

This invention relates to the field of extrusion technology. In particular this invention pertains to extruders. More particularly, this invention relates to twin-screw extruders, which contain novel fractional elements. Salient features of the invention are that the known element geometry allows for constant tip angle for all elements. A new class of elements herein called fractional elements has been invented. The characteristic of these elements is that they can have different tip angles. The tip angle is a critical component in the design of extruders. These novel elements work as conjugate pairs while satisfying the needs of twin-screw extruders. The fractional elements are suitable for processes such as mixing, dispersing, alloying, blending, plasticising, kneading, devolatising and metering of the material.

BACKGROUND ART

Twin-screw extruders are known in the art. A number of varieties of such elements for twin-screw extruders have been patented. Scanning through patent literature pertaining to twin-screw extruders, it has been found that the following patent specifications are of relevance to this invention. The cited documents and detailed description of prior art In respect of twin-screw extruders are enumerated as under.

References have been made to the following patent specifications and the merit and demerit of these inventions are described in the following paragraphs.

U.S. Pat. No. 4,824,256
U.S. Pat. No. 4,131,371
European Patent Number 0037984

As known in the art, co-rotating twin-screw extruders have a long barrel (a.k.a. casing or housing) with two parallel bores that intersect each other. Two parallel shafts that are both driven in the same direction without any slip are placed in the bores. Processing segments are mounted one after another in a continuous chain on the shaft that transmits the rotary motion without slippage to the segments. The twin-screw extruder segments (a.k.a. compounding elements) consist of kneading elements (a.k.a. kneading disks or kneading blocks), conveying elements (a.k.a. screws or screw elements), mixing elements and other special elements. These carry out the various tasks of mixing, dispersing, kneading, blending, conveying, devolatising and metering of material that are fed in the extruder. Each element on one shaft while maintaining continuity with the adjacent elements on the same shaft has a corresponding conjugate element in the perpendicular direction on the other shaft. The characteristic of the elements is that of conjugacy (similar to two intermeshing counter-rotating gears). They virtually wipe each other as they rotate in the same direction.

The tip-angle is a critical component in the design of twin-screw extruders. The tip-angle for the known fully wiping co-rotating elements is given by the following equation (1)

$$t = \pi/n - (2 \cos^{-1} r) \quad (1)$$

where
't'—Tip angle
'no'—Number of lobes (or) flights (or) starts
'r'—Adjusted Center distance to Barrel Diameter ratio
and $$r = (c - \delta c)/(b - \delta b) \quad (2)$$

where
'c'—Distance between the center of the two bores (Center Distance)
'b'—Diameter of the bores (Barrel Diameter)
'δc'—Planned clearance (or) gap between the elements
'δb'—Planned clearance (or) gap between the barrel and the element Note δc and δb are typically small values.

It is evident that if the following condition (3) is satisfied, a lobe with a tip angle greater than zero can be formed.

$$\cos(\pi/2n) \leq r < 1 \quad (3)$$

The ratio of the center distance to the barrel diameter therefore controls the maximum number of lobes that are possible in the extruder with acceptable tip angle. An extruder constructed with a ratio closer to 1 can have many lobes 30 with non-zero tip angle. Typical extruders have only two lobes ('r'=~0.8) or three lobes ('r'=~0.9). The end geometry has rotational symmetry with respect to the number of lobes. Higher number of lobes results in a smaller tip angle in the element. The surface of the various elements is obtained by cylindrical or helical or rotary transformation of the end geometry.

A smaller 'r' is preferred due to better efficiencies in the operation in terms of power consumption and output rates. However, the reduction in number of lobes leads to lower plasticising capacity in the kneading zone of the extruder for certain applications. U.S. Pat. No. 4,824,256 discloses new kneading elements, retaining the known geometry of twin-screw elements, designed with more number of lobes for an extruder that has a smaller 'r'. This is achieved by using in the design a barrel diameter that is smaller than the actual barrel diameter until an acceptable 'r' (greater that 0.866 for three lobes) is achieved. The element so designed with more lobes is then mounted in an eccentric manner with respect to the center of the shaft A group of such disks one after the other at a specific angle to one another forms a kneading element. These elements continue to be conjugate and are fully-wiping in nature.

Limitations of the Prior Art

The hitherto known twin-screw elements have equal tip angles for all lobes.

These limit the flexibility in designing the different type of elements that work in a twin-screw extruder. For example, the small tip angle in the eccentric tri-lobed kneading element leads to higher wear rate as only one of the tips operates closer to the barrel wall. Increasing the tip-angle would reduce the free volume available in the extruder. Further more, increasing tip-angle also makes the element become close to a circular shape. It is known from European Patent Specification No. 0037984 that an eccentric disk with a circular cross-section can be used. Such an element can be classified as zero lobed. However, the desired platicising action reduces with increased circularity and therefore increase in tip angle is not preferred.

DISCLOSURE OF THE INVENTION

Our invention tackles these limitations in the following manner. The known element geometry allows for constant Up angle for all elements. A new class of elements called fractional elements have been invented that can have different tip angles. These elements continue to work as conjugate pairs while satisfying the needs of twin-screw extrusion.

The objective of the invention is to provide co-rating twin-screw extruders with new element geometry that can provide a greater flexibility in design of individual elements. The end geometry of known elements is limited by constant tip angle for all lobes. The known end geometry are limited to just a few possibilities for a given center distance to barrel diameter ratio 'r'.

The primary objective of the invention is to design and develop a novel twin-screw extruder, which contains novel fractional elements.

Another object of invention is to invent a novel twin-screw extruder, which has greater flexibility in design of individual components.

Another object of the invention is to invent a novel twin-screw extruder for achieving a perfect transition by ensuring that for each cross-section of the element on one shaft there exists a conjugate cross-section on the corresponding shaft that is fully wiping.

Further objects will be clear from the following description.

A twin-screw extruder having elements for processing thermoplastic, thermoset and other material, embodies a barrel with two parallel intersecting bores, two sets of co-rotating fully intermeshed extruder elements that are linked to each other in a non rotary manner forming a continuous chain, each operating in one of the bores, each screw being provided with multi-lobed elements that have geometry such that the tip angles are different for some of the lobes that range from two to infinity and these geometry are transformed in a cylindrical or helical or rotary manner with or without interruption to form various types of fractional elements for various operations defined in the specification.

The invention is described in detail with reference to drawings accompanying this specification.

FIG. 1 is the end geometry of a known twin-screw extruder

FIG. 2 is the horizontal section through the processing zone of the twin-screw extruder showing segmented elements FIG. 3 is the end geometry of a known two-lobed element that is transformed helically or cylindrically with rotation to form a kneading or a conveying element FIG. 4 is the end geometry of a known three-lobed element that can be similarly transformed FIG. 5 is a rotated position of the element in FIG. 3

The detailed description of the invention is as follows.

Figure 1:
Figure 2:
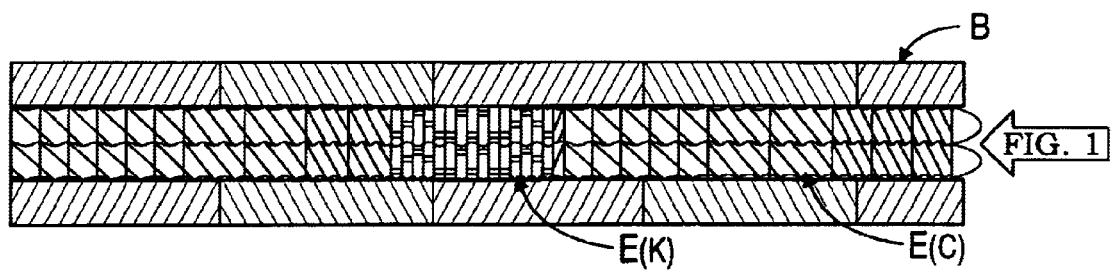

The processing section of a twin-screw extruder shown in FIG. 2 has segmented barrels 'B' and extruder elements 'E' [primarily conveying elements 'E(C)' and kneading elements 'E(K)']. A view of the extruder from the front shows tri-lobed elements located inside the intersecting parallel bores in FIG. 1.

Figure 3:
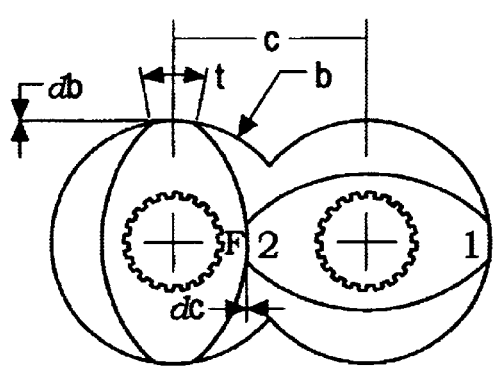
Figure 4:
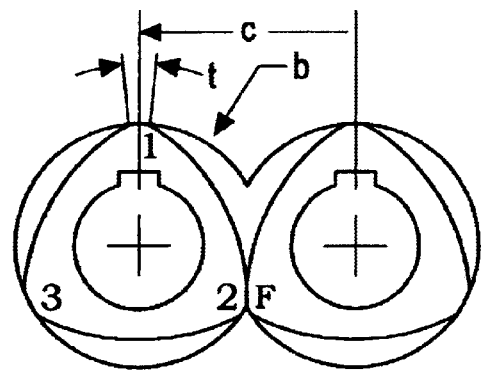
Figure 5:
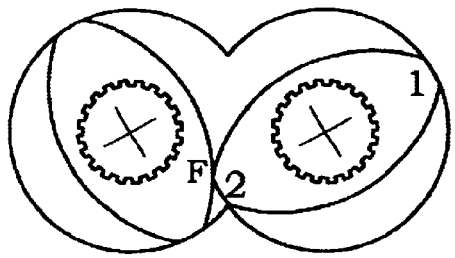
Figure 6:
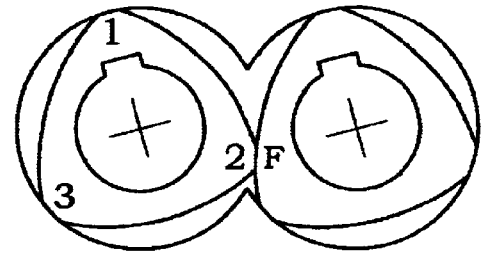
FIG. 6 is a rotated position of the element in FIG. 4

The number of lobes that can be designed in an extruder depends on the center distance to barrel diameter ratio 'r'. The 'n=2' lobed geometry shown in FIG. 3 confirms to an 'r' of 0.8. The clearance $\delta c$ and $\delta b$ are also shown in the enlarged inset. The lobes are numbered 1 and 2. The rotated view shows that the end geometry is such that one element tip wipes the other element at point P. A three-lobed geometry is shown in FIG. 4 along with a rotated view in FIG. 6. The ratio 'r' for this geometry is 0.9.

Figure 7:
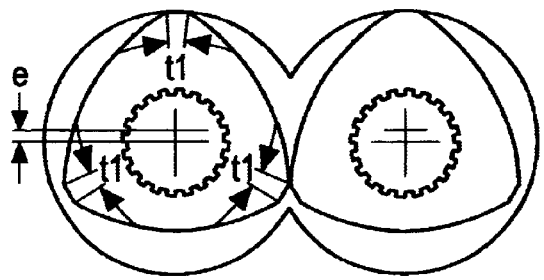
FIG. 7 is the end geometry of an eccentric tri-lobed element using constant tip-angle geometry
Figure 9:
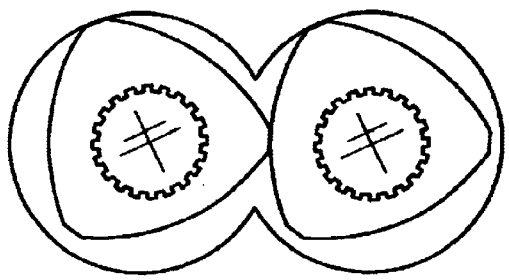
FIG. 9 is a rotated position of the element in FIG. 7

The eccentric tri-lobed shown in FIG. 7 is discussed in U.S. Pat. No. 4,824,256. The tip angle ti is constant across all the lobes of this geometry. FIG. 9 shows a rotated position of FIG. 7.

Figure 8:
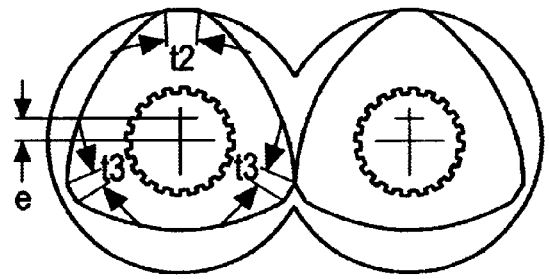
FIG. 8 is the end geometry (1.3.80) of a new fractional element
Figure 10:
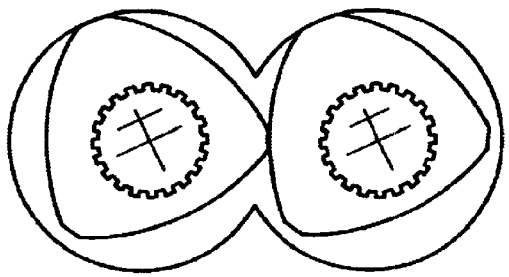
FIG. 10 is a rotated position of the element in FIG. 8

The end geometry with unequal tip angle '$t_2$' and '$t_3$' shown in FIG. 8 is that of one of the fractional elements invented. The fractional element classified as 1.3.80 means that it is formed as a transition of a single-lobed and a tri-lobed geometry and the new geometry is one closer to the tri-lobed. FIG. 10 shows a rotated position.

Figure 11:
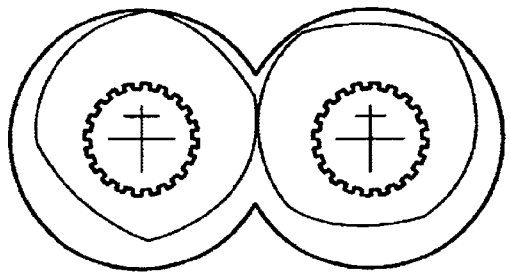
FIG. 11 is the end geometry (2.4.50) of another new fractional element
Figure 12:
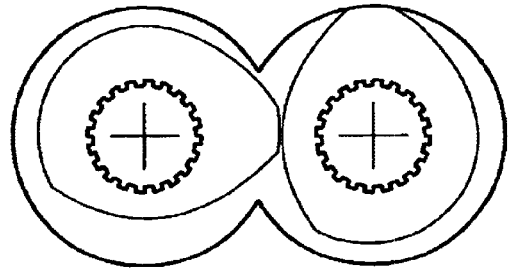
FIG. 12 is the end geometry (1.2.50) of another new fractional element

FIG. 11 is the end geometry of a fractional element. The geometry is classified as 2.4.50. It is formed by a transition of a two-lobed and four-lobed element. The geometry is at a section that is half way through the transition. FIG. 12 is the end geometry classified as 1.2.50. This is half way between a uni-lobed and a bi-lobed element.

Figure 13:
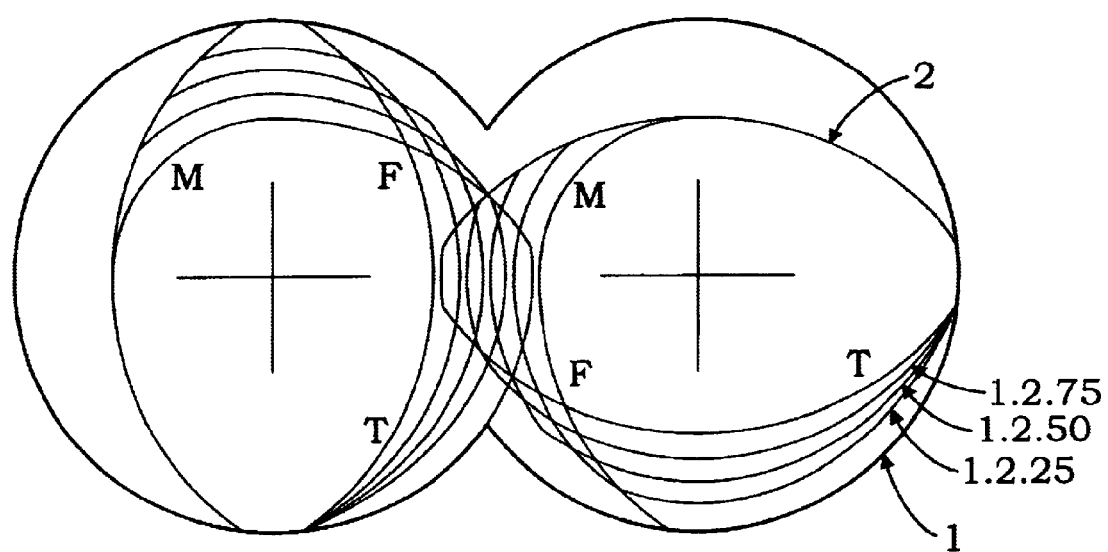
FIG. 13 shows the formation of the new fractional element geometry

FIG. 13 shows clearly the basis for the classification. The last fraction provides the location of the transition between the uni-lobed and bi-lobed element. The figure shows clearly the types of transition namely, the M type, T type and F type transition. These three types of transitions covers all possibilities of transitions. It may be noted that all three types of transitions are not necessary to generate fractional geometry. The geometry in FIG. 8 has only M type and T type of transition.

Figure 14:
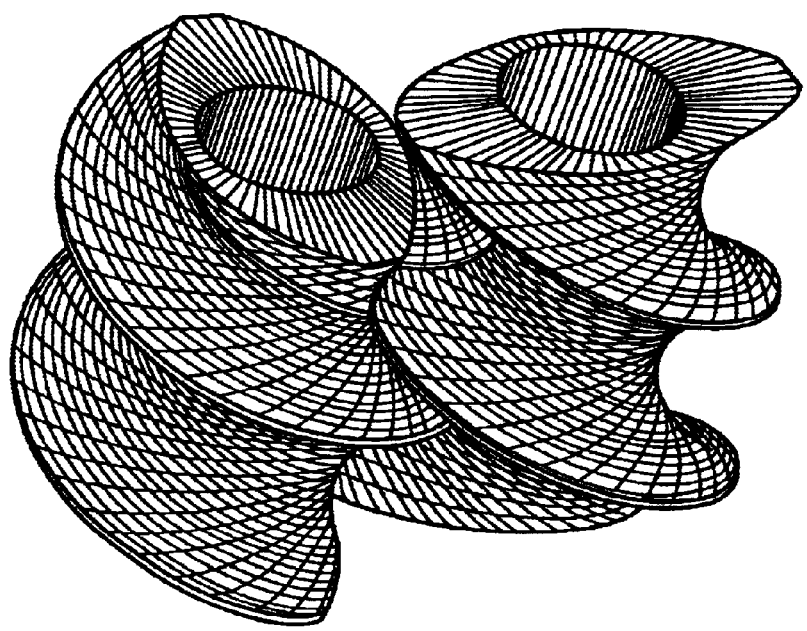
FIG. 14 shows the formation of a conveying screw element by helical transformation.

FIG. 14 shows a pair of co-rotating bi-lobed conveying screw element with known geometry formed by helical transformation of the end geometry. The lines show the path of the transformation.

Figure 15:
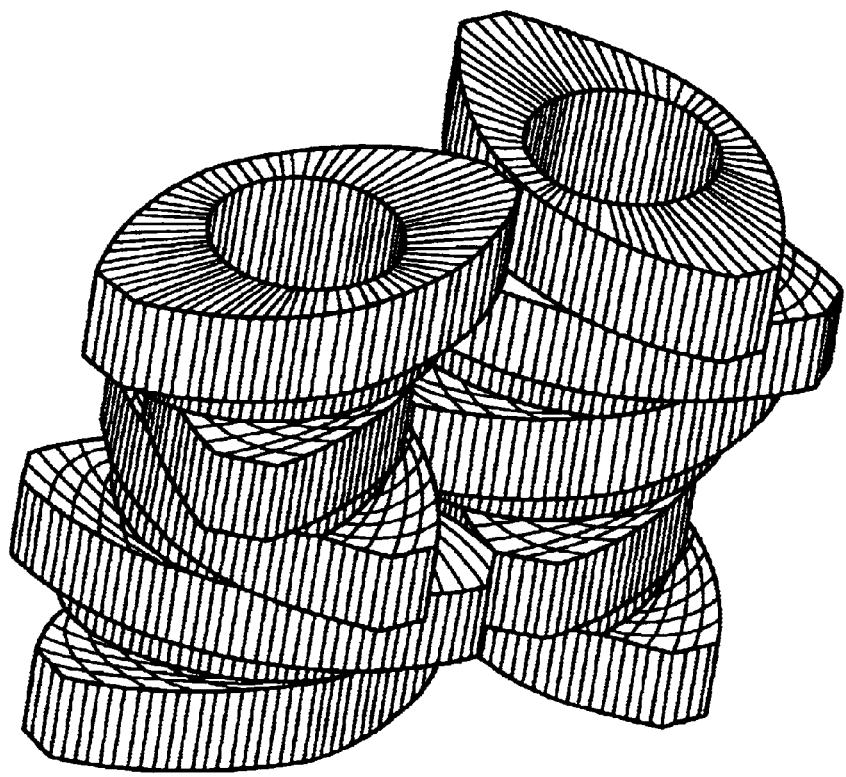
FIG. 15 shows the formation of a kneading block by cylindrical and rotary transformation.

FIG. 15 shows a pair of co-rotating bi-lobed kneading block with known geometry formed by cylindrical and intermittent rotary transformation of the end geometry.

As stated above, the objective of the invention is to provide co-rating twin-screw extruders with new element geometry that can provide a greater flexibility in design of individual elements. The end geometry of known elements is limited by constant tip angle for all lobes. The known end geometry are limited to just a few possibilities for a given center distance to barrel diameter ratio 'r'.

Consider an element, as in FIG. 13, such that ends have different geometry (i.e. different number of lobes). Consider that the geometry of the element is continuously transforming from one end to the other. For any given ratio 'r', if an 'n' lobed element is possible with a non-zero tip angle, then 1 to n−1 lobes are also possible. A perfect transition is one where at each cross-section of the element on one shaft there exists a conjugate cross-section on the corresponding shaft that is fully wiping.

If 'n' is the number of lobes on one end with less lobes and 'N' is the number of lobes on the other end with more lobes, then the condition for a perfect transition is that 'N/n' should be a whole number. In such an event, every intermediate section can give rise to a new element with unequal tip angle, a fractional element. There are only three types of transitions in these circumstances. These can be classified as 1. M type transition
2. T type transition
3. F type transition The exact nature of the mathematics involved in these transitions is truly complex compared to the simple known geometry used in twin-screw extruders. It is the application of computers and use of analytical tools in both design and manufacture that makes it possible to define the mathematics behind these complex elements and use kinematic transformations such as cylindrical or helical or rotary to generate the individual elements.

It is to be noted that the aforesaid description is intended to explain the salient features of the invention and it is not intended to limit the scope of the invention.

It is to be further noted that within the scope of the invention, various modifications are permissible. The scope of the invention is designed in the above description.

What is claimed is:

1. A twin-screw extruder comprising:
   a barrel defining a first cylindrical bore and a second cylindrical bore, wherein the first cylindrical bore and the second cylindrical bore intersect to form a chamber;
   a first shaft that rotates within the first bore about an axis;
   a second shaft that rotates within the second bore about an axis; and
   a first set of fractional elements coupled to the first shaft and a second set of fraction elements coupled to the second shaft, each set having a first fractional element with a first lobe defining a first tip angle, a second lobe defining a second tip angle, and a third lobe defining a third tip angle that is different from the first tip angle and the second tip angle.

2. The twin-screw extruder of claim 1 wherein the first fractional element of the first set and the first fractional element of the second set maintain a constant minimum clearance between each other when rotating in the same direction.

3. The twin-screw extruder of claim 2 wherein the first fractional element of the first set and the first fractional element of the second set each have a fourth lobe defining a fourth tip angle.

4. The twin-screw extruder of claim 2 wherein the first set and the second set each have a second fractional element.

5. The twin-screw extruder of claim 2 wherein the first fractional element of the first set is coupled eccentric to the axis of the first shaft and the first fractional element of the second set is coupled eccentric to the axis of the second shaft.

6. The twin-screw extruder of claim 2 wherein the geometry of the first fractional element of the first set and the geometry of the first fractional element of the second set are transformed axially in a helical manner.

7. The twin-screw extruder of claim 2 wherein the geometry of the first fractional element of the first set and the geometry of the first fractional element of the second set are transformed axially in a cylindrical manner.

8. The twin-screw extruder of claim 2 further including a first transitional element coupled to the first shaft and a second transitional element coupled to the second shaft, wherein the transitional elements each have a cross-sectional geometry at one end and a different cross-sectional geometry at another end.

9. The twin-screw extruder of claim 8 wherein the first transitional element and the second transitional element maintain a constant minimum clearance between each other when rotating in the same direction.

10. The twin-screw extruder of claim 8 wherein one of the cross-sectional geometries of the first transitional element substantially matches a cross-sectional geometry of the first fractional element of the first set.

11. The twin-screw extruder of claim 10 wherein one of the cross-sectional geometries of the second transitional element substantially matches a cross-sectional geometry of the second fractional element of the first set.

12. A conjugate pair of fractional elements for a twin-screw extruder having a first shaft and a second shaft, comprising: a first fractional element adapted to be coupled to the first shaft; and a second fraction element adapted to be coupled to the second shaft; wherein the first fractional element and the second fractional element each have a first lobe defining a first tip angle, a second lobe defining a second tip angle, and a third lobe defining a third tip angle that is different from the first tip angle and the second tip angle.

13. The conjugate pair of claim 12 wherein the first fractional element and the second fractional element are shaped such that they maintain a constant minimum clearance when rotating in the same direction.

14. The conjugate pair of claim 13 wherein the first fractional element and the second fractional element each have a fourth lobe defining a fourth tip angle.

15. The conjugate pair of claim 13 wherein the geometry of the first fractional element and the geometry of the second fractional element are transformed axially in a helical manner.

16. The conjugate pair of claim 13 wherein the geometry of the first fractional element and the geometry of the second fractional element are transformed axially in a cylindrical manner.

17. A fractional element for a twin-screw extruder, comprising: a first lobe defining a first tip angle, a second lobe defining a second tip angle, and a third lobe defining a third tip angle that is different from the first tip angle and the second tip angle.

18. The fractional element of claim 17 further comprising a fourth lobe defining a fourth tip angle.

19. The fractional element of claim 17 wherein the geometry is transformed axially in a helical manner.

20. The fractional element of claim 17 wherein the geometry is transformed axially in a cylindrical manner.

* * * * *

UNITED STATES PATENT AND TRADEMARK OFFICE
CERTIFICATE OF CORRECTION

PATENT NO. : 6,783,270 B1
DATED : August 31, 2004
INVENTOR(S) : Babu Padmanabhan It is certified that error appears in the above-identified patent and that said Letters Patent is hereby corrected as shown below:

Title page,
Item [57], ABSTRACT,
Line 1, "extrude" should read -- extruder --.

Column 1,
Line 27, "In" should read -- in --.

Column 4,
Line 31, "dearly" should read -- clearly --.
Line 63, "'no'" should read -- 'in' --.

Column 2,
Line 13, formula, "$\cos(\pi/2n) \leq r < 1$" should read -- $\cos(\pi/2n) \leq r \leq 1$ --;
Line 19, "30" should be deleted;
Line 38, "center of the shaft A" should read -- center of the shaft. A --;
Line 63, "Up" should read -- tip --.

Column 3,
Line 5, "Up" should read -- tip --.

Column 4,
Line 13, "ti" should read -- $t_1$ --.

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,783,270 B1
DATED : August 31, 2004
INVENTOR(S) : Babu Padmanabhan It is certified that error appears in the above-identified patent and that said Letters Patent is hereby corrected as shown below:

<u>Title page,</u>
Item [57], ABSTRACT,
Line 1, "extrude" should read -- extruder --.

<u>Column 1,</u>
Line 27, "In" should read -- in --.

<u>Column 4,</u>
Line 31, "dearly" should read -- clearly --.
Line 63, "'no'" should read -- 'n' --.

<u>Column 2,</u>
Line 13, formula, "cos ($\pi$/2n) $\leq$ r < 1" should read -- cos ($\pi$/2n) $\leq$ r $\leq$ 1 --;
Line 19, "30" should be deleted;
Line 38, "center of the shaft A" should read -- center of the shaft. A --;
Line 63, "Up" should read -- tip --.

<u>Column 3,</u>
Line 5, "Up" should read -- tip --.

<u>Column 4,</u>
Line 13, "ti" should read -- $t_1$ --.

This certificate supersedes Certificate of Correction issued December 14, 2004.

Signed and Sealed this

Twenty-fourth Day of May, 2005

JON W. DUDAS
*Director of the United States Patent and Trademark Office*